United States Patent
Kim et al.

(10) Patent No.: US 8,199,853 B2
(45) Date of Patent: Jun. 12, 2012

(54) METHOD FOR FEEDBACK AND METHOD FOR CONFIGURING A CODEBOOK IN MULTI-ANTENNA SYSTEM

(75) Inventors: Jae Wan Kim, Anyang-si (KR); Bin Chul Ihm, Anyang-si (KR); Jin Hyuk Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/673,749

(22) PCT Filed: Aug. 14, 2008

(86) PCT No.: PCT/KR2008/004741
§ 371 (c)(1),
(2), (4) Date: Jan. 14, 2011

(87) PCT Pub. No.: WO2009/022871
PCT Pub. Date: Feb. 19, 2009

(65) Prior Publication Data
US 2011/0096859 A1    Apr. 28, 2011

(30) Foreign Application Priority Data

Aug. 14, 2007    (KR) .................. 10-2007-0082018

(51) Int. Cl.
*H04L 27/00*    (2006.01)

(52) U.S. Cl. ........ 375/299; 375/267; 375/295; 370/334; 455/101

(58) Field of Classification Search .................. 375/267, 375/299, 295, 146, 219; 370/334; 455/101
See application file for complete search history.

(56) References Cited

U.S. PATENT DOCUMENTS

| | | | |
|---|---|---|---|
| 2008/0205533 A1* | 8/2008 | Lee et al. | 375/260 |
| 2008/0247364 A1* | 10/2008 | Kim et al. | 370/336 |
| 2009/0003473 A1* | 1/2009 | Cho et al. | 375/260 |
| 2011/0122971 A1* | 5/2011 | Kim et al. | 375/316 |

FOREIGN PATENT DOCUMENTS

| | | |
|---|---|---|
| EP | 1117197 | 7/2001 |
| EP | 1508992 | 2/2005 |
| WO | 03/021795 | 3/2003 |

\* cited by examiner

*Primary Examiner* — Ted Wang

(74) *Attorney, Agent, or Firm* — Lee, Hong, Degerman, Kang & Waimey

(57) ABSTRACT

A feedback method for a multi-antenna system is disclosed. The feedback method for use in the multi-antenna system can reduce an amount of transmission (Tx) feedback information associated with a precoding matrix (i.e., a codebook). For example, a single codebook may include precoding matrixes associated with several ranks. A basic matrix constructing the precoding matrix is extended to a frequency axis, such that it can be used as a Cyclic Delay Diversity (CDD) structure.

6 Claims, 3 Drawing Sheets

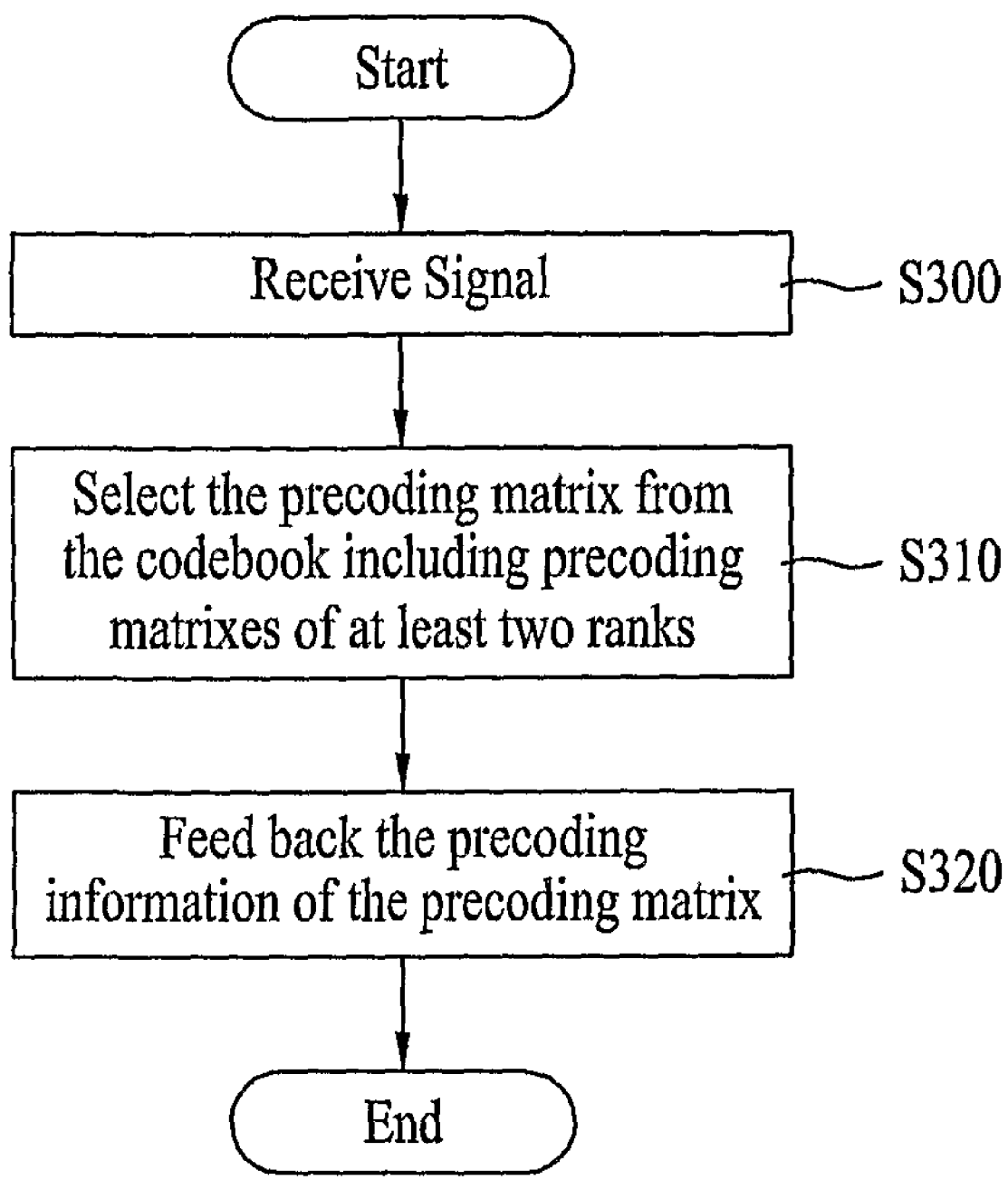

METHOD FOR FEEDBACK AND METHOD FOR CONFIGURING A CODEBOOK IN MULTI-ANTENNA SYSTEM

CROSS-REFERENCE TO RELATED APPLICATIONS

This application is the National Stage filing under 35 U.S.C. 371 of International Application No. PCT/KR2008/004741, filed on Aug. 14, 2008, which claims the benefit of earlier filing date and right of priority to Korean Application No. 10-2007-0082018, filed on Aug. 14, 2007.

TECHNICAL FIELD

The present invention relates to a multi-antenna system, and more particularly to a feedback method for use in a multi-antenna system and a method for configuring a codebook in the multi-antenna system.

BACKGROUND ART

A multi-antenna system for performing precoding data using feedback information will hereinafter be described in detail.

FIG. 1 is a block diagram illustrating a multi-antenna system.

In more detail, FIG. 1 shows a structure of a transmission end. The transmission end may be a base station (BS) (also called a Node-B) or a user equipment (UE) (also called a mobile station). In the transmission end, user data to be transmitted from the transmission end (e.g., the base station (BS)) to a reception end is configured in the form of a single stream or multi-data stream, and is then applied to a channel encoder 101. The channel encoder 101 performs a channel encoding. A modulator 102 performs a constellation mapping process on data. The symbolized data is multiplied by a precoding vector, and the multiplied result is transmitted to each antenna 104.

In the meantime, the precoding matrix information is fed back from a reception end. Preferably, the precoding matrix may be selected by feedback information. A controller 105 selects desired users or desired precoding matrixes using feedback information received from the reception end.

A variety of technologies proposed by the 3rd Generation Partnership Project Long Term Evolution (3GPP LTE), for example, a Per Antenna Rate Control (PARC), a Per Stream Rate Control (PSRC), and a Per User Unitary Rate Control (PU2RC), can be implemented with the structure of FIG. 1.

The 3GPP LTE has generally introduced a precoding scheme to a closed-loop multi-antenna system. A representative example of the precoding scheme is a PU2RC or a SIC-based Per User and Stream Rate Control (S-PUSRC).

In the case of the PU2RC, a matrix acquired by the number of transmission (Tx) antennas is extended on the basis of Fourier series, such that the extended resultant matrix is used as a unitary matrix for the precoding.

$$e_m^{(g)} = \frac{1}{\sqrt{M}} \left[ w_{0m}^{(g)} \ldots w_{(M-1)m}^{(g)} \right]^T \quad \text{[Equation 1]}$$

$$w_{nm}^{(g)} = \exp\left\{ j\frac{2\pi n}{M}\left(m + \frac{g}{G}\right) \right\}$$

In Equation 1, $e_m^{(g)}$ is a unitary precoding vector, represents the total number of Tx antennas, and 'G' represents the total number of groups of a precoding matrix. 'n' represents the n-th antenna, and g' represents the g-th group. The precoding matrix can be specified by the combination of 'n' and 'g'. 'm' is indicative of the m-th beam-forming pattern.

The S-PUSRC scheme uses a switching beam-forming vector as a precoding matrix.

$$P=[a_1 a_2 a_{2N}]$$

$$a_i = [1 e^{j\phi_i} \ldots e^{j(N-1)\phi_i}]^T, \phi_i = kd \sin(\phi_i) \quad \text{[Equation 2]}$$

In Equation 2, 'N' represents the number of antennas, $\alpha_i$ represents a precoding vector, 'k' represents a wavelength, θ represents a steering direction, and 'd' represents the distance between neighboring antennas.

A closed-loop multi-antenna system based on a conventional precoding scheme can support any one of a Space Division Multiplexing (SDM) scheme, a Space Division Multiplexing Access (SDMA) scheme, and a beam-forming scheme. If a single user is selected, the SDM scheme is designed to transmit at least one data stream for the single user. If several users (i.e., multi-user) are selected, the SDMA scheme is designed to transmit data to the multi-user via a specific beam. A specific beam is formed by a beam-forming scheme, and data is transmitted via the formed beam. The SDM scheme is called a single-user MIMO scheme. The SDMA scheme is called a multi-user MIMO scheme. Individual characteristics of the above-mentioned three schemes will hereinafter be described in detail.

The single-user MIMO scheme for use in the closed-loop system has different accuracies according to an amount of antenna weight data which is fed back from a reception end (e.g., a user equipment (UE)), such that a MIMO performance is also changed according to the changed accuracy. Particularly, if the number of antennas is at least 4, the size of associated codebook increases, such that the amount of feedback data also increases.

If the multi-user MIMO scheme uses many precoding matrixes to design a codebook, it has difficulty in grouping the multi-user, such that it is difficult for a MIMO system to be implemented.

Finally, according to the beam-forming scheme, the requested interval between antennas of the beam-forming scheme is different from that of the MIMO scheme, such that the beam-forming scheme cannot apply the beam-forming scheme and the MIMO scheme to the same transmission system at the same time.

The single-user MIMO scheme of the closed-loop system has different accuracies according to an amount of antenna weight data which is fed back from the user equipment (UE), such that a MIMO performance is also changed according to the changed accuracy. Particularly, if the number of antennas is at least 4, the size of associated codebook increases, such that the amount of feedback data also increases.

A reception (Rx) performance is greatly affected depending on methods for designing the codebook. Therefore, there is needed a method for reducing an amount of feedback data simultaneously while designing a codebook having a superior performance. A complexity of a receiver should be taken into account when designing a MIMO codebook.

Conventional codebooks have superior performances in a low-correlation channel, but they have less superior performances under a high channel correlation. There is a growing tendency for the above-mentioned codebooks to have different performances according to an antenna structure and the intervals between antennas.

Also, the conventional multi-antenna system has difficulty in designing a systematic codebook having codebook-based adaptability according to a codebook-size extension and a channel status (i.e., a rank).

DISCLOSURE

Technical Problem

Accordingly, the present invention is directed to a feedback method and a method for constructing a codebook in a multi-antenna system that substantially obviate one or more problems due to limitations and disadvantages of the related art. An object of the present invention is to provide a feedback method for use in a multi-antenna system. Another object of the present invention is to provide a method for transmitting/receiving precoding information in a multi-antenna system. Another object of the present invention is to provide a method for constructing a codebook in a multi-antenna system.

Technical Solution

To achieve these objects and other advantages and in accordance with the purpose of the invention, as embodied and broadly described herein, a feedback method for use in a multi-antenna system comprises: selecting a precoding matrix from a codebook including precoding matrixes of at least two ranks, and feeding back precoding information of the selected precoding matrix to a transmission end; and receiving a signal precoding-processed by the precoding matrix.

Preferably, the codebook includes at least one precoding matrix of at least one of a first rank 1, a second rank 2, a third rank 3, and a fourth rank 4. Preferably, the precoding matrix includes at least one of a Discrete Fourier Transform (DFT) matrix and an Antenna Selection (AS) matrix. Preferably, the precoding matrix is a Precoding Matrix Index (PMI) contained in the codebook.

Preferably, each precoding matrix contained in the codebook is multiplied by a phase shift matrix. Preferably, each precoding matrix contained in the codebook is multiplied by a phase shift matrix extended to a frequency axis. Preferably, each precoding matrix contained in the codebook has a Cyclic Delay Diversity (CDD) structure.

In another aspect of the present invention, there is provided a method for constructing a codebook in a multi-antenna system comprising: constructing a precoding matrix associated with each of two or more ranks; and constructing a codebook to include the precoding matrix of each of the two or more ranks.

Preferably, the precoding matrix includes at least one of a Discrete Fourier Transform (DFT) matrix and an Antenna Selection (AS) matrix. Preferably, one of the two or more ranks is one of a first rank 1, a second rank 2, a third rank 3, and a fourth rank 4.

Advantageous Effects

The present invention can more effectively transmit feedback information using a feedback method of a multi-antenna system. Also, system efficiency can be optimized.

A conventional codebook structure must additionally add 2 bits as rank information for rank adaptability to an index bit of a precoding matrix, such that the total number of bits increases by 2 bits. However, an inventive codebook need not transmit 2 additional bits as rank information for rank adaptability, but includes the rank information for rank adaptability in the precoding matrix index, such that an amount of additional signaling overhead for the rank adaptability can be reduced.

If a phase shift matrix is extended to a frequency axis using the same method as that of a CDD, a gain required for the codebook can be acquired by a scheduling process, and the present invention has a complexity lower than that of the conventional codebook structure. In other words, if the present invention uses a codebook in which a DFT matrix or an antenna selection matrix is used as a basic matrix, and is then coupled to a CDD, a phase is shifted to a frequency axis of a phase shift matrix, such that the present invention is able to use a codebook to which a phase shift value appropriate for a current channel is added. As a result, resources are allocated on the frequency axis by a frequency-axis scheduling, such that it is expected that a codebook gain can be sufficiently acquired.

If a DFT matrix or an antenna selection matrix is used as a basic matrix in the case of constructing a codebook proposed by the present invention, the present invention can design a codebook composed of only precoding matrix index information which does not require additional rank information for rank adaptation. Therefore, the present invention can reduce an amount of overhead of using additional signaling information in order to feed back the additional rank information for rank adaptation. If the present invention uses a basic DFT matrix or an antenna selection matrix in the case of designing a codebook, it has a complexity lower than that of the conventional codebook structure.

In the case of using the codebook proposed by the present invention, more particularly, if the number of precoding matrixes of each rank is less than the number of allocated feedback bits, it is expected that the present invention is more advantageous to the conventional art because the present invention need not transmit additional rank information, resulting in the reduction of the number of feedback bits. Also, the precoding matrixes of several ranks are used as a single codebook, resulting in the reduction of the number of codebooks.

DESCRIPTION OF DRAWINGS

The accompanying drawings, which are included to provide a further understanding of the invention, illustrate embodiments of the invention and together with the description serve to explain the principle of the invention.

In the drawings:

FIG. 3 is a flow chart illustrating a feedback method according to one embodiment of the present invention.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, the following detailed description will disclose a variety of embodiments and modifications of the present invention. In some cases, in order to prevent ambiguous concepts of the present invention from being occurred, conventional devices or apparatus well known to those skilled in the art will be omitted and be denoted in forms of a block diagram on the basis of the important functions of the present invention. Wherever possible, the same reference numbers will be used throughout the drawings to refer to the same or like parts.

Figure 1:
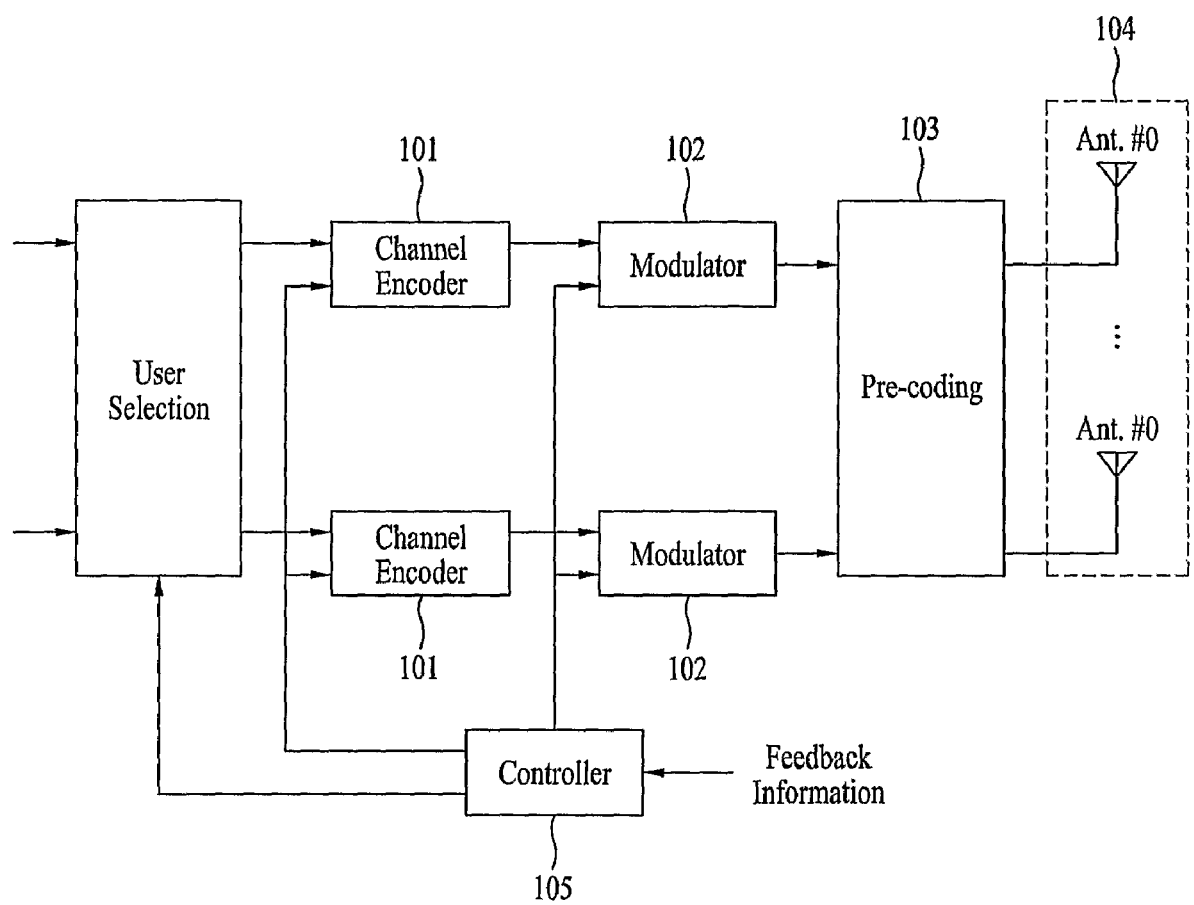
FIG. 1 is a block diagram illustrating a multi-antenna system.
Figure 2:
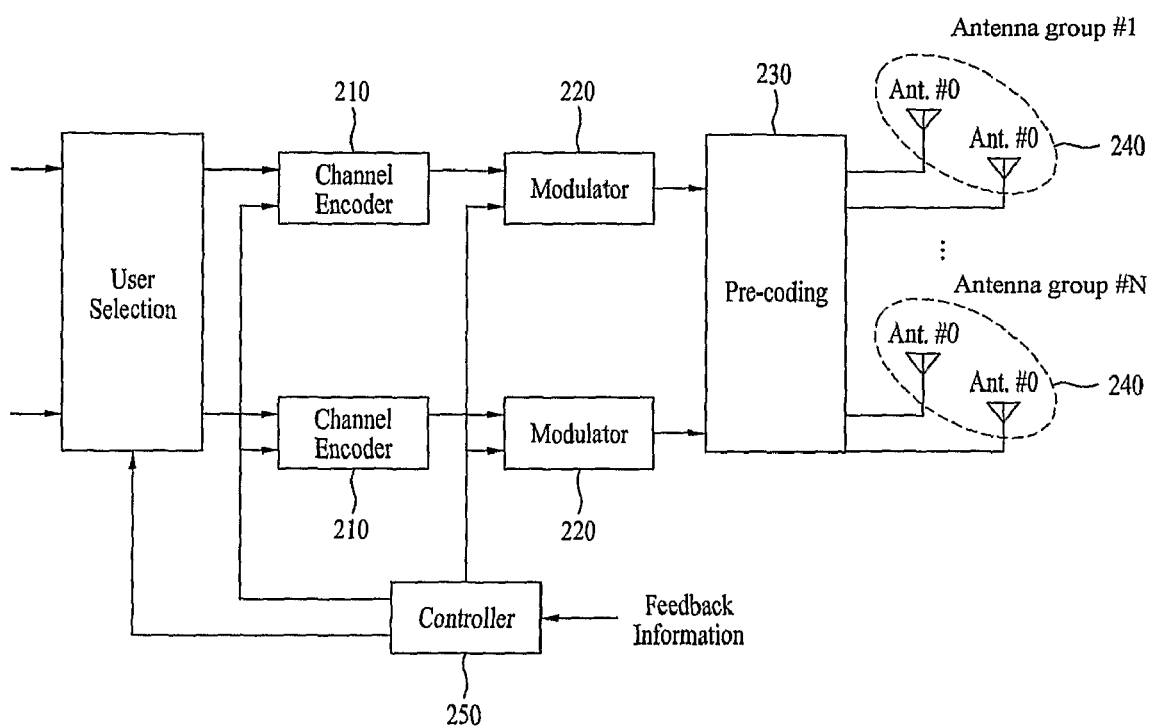
FIG. 2 is a block diagram illustrating a transmission end according to one embodiment of the present invention.

FIG. 2 is a block diagram illustrating a transmission end according to one embodiment of the present invention.

Referring to FIG. 2, a transmission end may be a base station (BS) (also called a Node-B) or a user equipment (UE) (also called a mobile station). In the transmission end, user data to be transmitted from the base station (BS) to the reception end is configured in the form of a single stream or multi-data stream, and is then applied to a channel encoder 210. A channel encoder 210 of FIG. 2 performs a channel encoding. A modulator 220 performs a constellation mapping process on data.

A precoding block 230 according to the present invention performs the precoding process using a precoding vector or a precoding matrix. Also, the precoded result is transmitted via several transmission (Tx) antennas 240. Preferably, a signal indicating the precoding matrix generated by the present invention may be received in a controller 250, and may then be selected by the same controller 250.

User data received in the channel encoder 210 may be a single stream or a multi-data stream. Each data stream may experience a constellation-mapping process for modulation. The resultant symbolized data is multiplied by the precoding vector, and the multiplied result is transmitted to each antenna. The controller 250 selects users or precoding matrixes using feedback information received from the reception end (e.g., the user equipment (UE)).

In order to perform the beam-forming function, the interval between antennas in N number of antenna groups may be set to $\lambda/2$, the distance between antennas groups may be set to $4\lambda$ or $10\lambda$, and a MIMO function may then be performed under the above interval and distance. If the MIMO function is performed, each group uses only a single antenna, such that N antennas from among all antennas are used. The above-mentioned antenna structure may be configured in different ways according to individual antenna transmission schemes.

Next, a method for communicating information of the precoding matrix between a transmission end and a reception end in a closed-loop scheme according to one embodiment of the present invention will hereinafter be described in detail.

When the information of the precoding matrix is communicated between the transmission end and the reception end as described above, each of information of the precoding matrix configuration may be transmitted, or an index for indicating each precoding matrix may be allocated such that index information may then be transmitted. In this case, the precoding matrixes may be configured to be contained in a predetermined precoding matrix group. In other words, the precoding matrix to be used in different ways according to individual situations may have predetermined rules, and a group including such precoding matrixes may be formed and used.

Also, the above-mentioned embodiment of the present invention may pre-transmit or pre-engage information of the precoding matrix group, and may transmit information for employing at least one of the precoding matrixes contained in each group. In this case, the above-mentioned embodiment may designate an index for indicating each precoding matrix contained in the precoding matrix group, and may then transmit the designated index. Since only the index information is transmitted, an amount of Tx overhead can be reduced. Information of the precoding matrix group is called a codebook.

Preferably, information of the codebook may be pre-recognized by not only the transmission end but also the reception end. The codebook may be designed in consideration of the number of Tx antennas, the number of Tx streams, or the number of bits used for feedback information. As described above, the precoding matrix may have different structures according to the number of Tx antennas and the number of Tx streams. For example, if the number of Tx antennas is 4 and the number of Tx streams is 2, the used precoding matrix is denoted by a 4×2 matrix.

The above-mentioned codebook may be configured in different ways according to individual ranks, and may then be used. In this case, "rank" is indicative of the number of Tx streams which can be transmitted via a multi-antenna at one time. In this case, in the case of an initial communication situation or a rank variation, additional information of the rank must be shared between the transmission end and the reception end. For example, the reception end must additionally transmit the rank information simultaneously while transmitting the precoding-matrix information.

However, according to the following embodiment of the present invention, a single codebook including precoding matrixes associated with several ranks may be configured and used.

According to the codebook structure proposed by this embodiment of the present invention, a precoding matrix index (PMI) indicating the precoding matrix contained in the codebook includes information associated with rank adaptation. Therefore, although the present invention does not transmit rank information for additional rank adaptation, a reception end of the precoding matrix index can recognize such rank information. In more detail, in the case of using the codebook proposed by the present invention, the present invention can greatly reduce an amount of overhead information transmitted over a control channel.

An exemplary codebook is shown in the following equation 3:

$$C_{15} = \{p_0, p_1, p_2, p_3, p_0p_1, p_0p_2, p_0p_3, p_1p_2, p_1p_3, p_2p_3, p_0p_1p_2, p_0p_1p_3, p_0p_2p_3, p_1p_2p_3, p_0p_1p_2p_3\}$$

In Equation 3, $p_0$, $p_1$, $p_2$, or $p_3$ is a precoding matrix or a column vector of the precoding matrix. As can be seen from the codebook shown in the equation 3, a single codebook includes the precoding matrixes ($p_0$, $p_1$, $p_2$, and $p_3$) of the rank 1, the precoding matrixes ($p_0p_1$, $p_0p_2$, $p_0p_3$, $p_1p_2$, $p_1p_3$, and $p_2p_3$) of the rank 2, the precoding matrixes ($p_0p_1p_2$, $p_0p_1p_3$, $p_0p_2p_3$, and $p_1p_2p_3$) of the rank 3, and the precoding matrix ($p_0p_1p_2p_3$) of the rank 4.

In the case of constructing the codebook of the Equation 3, the number of precoding matrixes of each rank can be freely changed in consideration of a channel situation or a moving speed of a communication object. In other words, the number of precoding matrixes contained in the single codebook is limited to 15, the number of the precoding matrixes of the rank 1 is 4, the number of the precoding matrixes of the rank 2 is 6, the number of the precoding matrixes of the rank 3 is 4, the number of the precoding matrixes of the rank 4 is 1. In this case, the number of the precoding matrixes capable of being contained in the single codebook, and the number of the precoding matrixes of each rank can be modified in various ways.

The number of the precoding matrix indexes contained in the codebook may be set to 15, and may be denoted by 4 bits. For example, the precoding matrix indexes of 0000, 0001, 0010, 0011, 0100, 0101, 0110, 0111, 1000, 1001, 1010, 1011, 1100, 1101, and 1110 may be sequentially arranged from the left of the codebook of the Equation 3.

As can be seen from Equation 3, in the case of using the codebook including the precoding matrixes associated with several ranks, although the present invention does not transmit additional rank information simultaneously while requesting rank adaptation, it can recognize the above rank information on the basis of the precoding matrix index.

For example, the reception end selects the precoding matrix ($p_0p_3$) from among several precoding matrixes contained in the codebook shown in the Equation 3, and transmits (i.e., feeds back) the precoding matrix index of 0110 corresponding to the selected precoding ($p_0p_3$). Therefore, the transmission end must perform the precoding process using the precoding matrix ($p_0p_3$) using the precoding matrix index of 0110, such that it can be recognized that rank information (i.e., a rank) for rank adaptation along with the precoding matrix is 2.

Rank information may be extracted from the precoding matrix index. For example, the precoding matrix of each rank may have the codebook including the precoding matrixes of several ranks according to a predetermined rule, such that a transmission end or a reception end must recognize the above predetermined rule. In this case, although the transmission end or the reception end does not receive rank information, rank information may be extracted according to the pre-recognized rule and the received precoding matrix index.

For example, it is assumed that a codebook including the precoding matrixes of several ranks includes 4 precoding matrixes of each rank, and the precoding matrixes from the rank 1 to the rank 4 are sequentially contained in the above codebook. It is assumed that the precoding matrix indexes from 0000 to 1111 are sequentially assigned to individual precoding matrixes. In this case, if the transmission end or the reception end receives the fifth precoding matrix index (e.g., the precoding matrix of 0100), rank information of 'Rank 2' may be extracted. In other words, although additional rank information is not received, rank information can be extracted.

In this way, in the case of using the codebook including the precoding matrixes of several ranks, there is no need to use additional information capable of feeding back rank information for rank adaptation, because the present invention can recognize the rank adaptation via the precoding matrix index (PMI) of the codebook itself as described above.

Next, a precoding matrix capable of being used to construct the above-mentioned codebook will hereinafter be described in detail.

According to this embodiment of the present invention, the precoding matrix may be extracted/selected from at least one of a Discrete Fourier Transform (DFT) matrix, an Antenna Selection (AS) matrix capable of being generated by an antenna selection (AS) scheme, and a vector of a House Holder (HH) scheme. A matrix capable of generating the precoding matrix such as the above-mentioned DFT matrix or the antenna selection (AS) matrix is called a basic matrix. The basic matrix is distinguished from the phase-shifted augmented matrix of each basic matrix. In this case, the basic matrix may be a unitary matrix or a non-unitary matrix. In the case of the unitary matrix, the sum of the multiplication results of components of each column of the matrix is 0, i.e., individual column vectors are orthogonal to each other. In the case of the non-unitary matrix, individual column vectors contained in the matrix are non-orthogonal to each other.

Next, the basic matrix acting as the unitary matrix, for example, a basic unitary matrix, will hereinafter be described in detail.

A DFT matrix used as the basic matrix contained in several precoding matrixes according to this embodiment of the present invention will hereinafter be described in detail. Particularly, it should be noted that the DFT matrix has strong resistance to a high-correlation spatial channel.

The following equation 4 shows an exemplary DFT matrix capable of being applied to four Tx antennas:

$$\{b_0, b_1, b_2, b_3\} = \frac{1}{2}\left\{\begin{pmatrix}1\\1\\1\\1\end{pmatrix}, \begin{pmatrix}1\\j\\-1\\-j\end{pmatrix}, \begin{pmatrix}1\\-1\\1\\-1\end{pmatrix}, \begin{pmatrix}1\\-j\\-1\\j\end{pmatrix}\right\} \quad \text{[Equation 4]}$$

As can be seen from the above Equation 4, it can be recognized that individual column vectors are orthogonal to each other. A first component of each column corresponds to a first Tx antenna, and a second component of each column corresponds to a second Tx antenna. A third component of each column corresponds to a third Tx antenna, and a fourth component of each column corresponds to a fourth Tx antenna. Provided that the present invention uses a single basic unitary matrix shown in the Equation 4, the reception end (e.g., the user equipment (UE)) feeds back feedback information of 2 bits to the transmission end (e.g., the base station (BS)), such that the transmission end may communicate with the reception end according to the SDM, SDMA, or the beam-forming scheme.

As described above, the present invention combines one or more column vectors contained in each column shown in Equation 4, such that the combined result may be used as a precoding matrix. The number of column vectors capable of being used as the precoding matrix may be decided by the rank (or the number of Tx streams). For example, if the number of Tx antennas is 4 and the rank is 2, two arbitrary column vectors from among four column vectors shown in Equation 4 indicating the 4×2 matrix are decided, such that the decided column vectors may be used as the precoding matrixes.

Also, the above-mentioned DFT basic matrix can be extended by a phase diagonal matrix shown in the following equation 5:

$$P(\Phi_i) = \begin{pmatrix} 1 & 0 & 0 & 0 \\ 0 & e^{j\Phi_i} & 0 & 0 \\ 0 & 0 & e^{j2\Phi_i} & 0 \\ 0 & 0 & 0 & e^{j3\Phi_i} \end{pmatrix} \quad \text{[Equation 5]}$$

In Equation 5, $\Phi_i$ is an i-th phase shift angle when an augmented matrix having one or more phase shift angles are used. $\Phi_i$ may be set to a predetermined value capable of maximizing the intensity of a Rx signal. The phase shift angle $\Phi_i$ may have a specific value, for example, $$\frac{2\pi m}{M}.$$

In this case, 'M' is the total number of Tx antennas. 'm' is an m-th virtual beam-forming pattern (i.e., a precoding matrix), and may have a predetermined integer value from among 0, 1, 2, ..., M−1. In other words, $\Phi_i$ may be equal to or higher than '0', and may be less than $2\pi$. Particularly, the phase diagonal matrix shown in Equation 5 may be called a phase shift matrix as necessary. In more detail, the phase diagonal matrix shown in Equation 5 is multiplied by the basic matrix (e.g., DFT matrix or antenna selection (AS) matrix), such that a virtual beam pattern corresponding to each column vector contained in the basic matrix can be phase-shifted by the phase shift angle $\Phi_i$.

If the phase shift matrix of the DFT codebook proposed by the present invention is extended to the frequency axis, the following equation 6 is acquired. If the phase shift matrix extended to the frequency axis of the following equation 6 is applied to the precoding matrix, the present invention can acquire the same effect as that of a Cyclic Delay Diversity (CDD) structure.

$$P(k) = \begin{pmatrix} 1 & 0 & 0 & 0 \\ 0 & e^{-j2\pi \frac{\tau}{N_{\mathit{fft}}}k} & 0 & 0 \\ 0 & 0 & e^{-j2\pi \frac{2\tau}{N_{\mathit{fft}}}k} & 0 \\ 0 & 0 & 0 & e^{-j2\pi \frac{3\tau}{N_{\mathit{fft}}}k} \end{pmatrix}$$ [Equation 6]

In Equation 6, k is the order of OFDM Tx sub-carriers, and $N_{\mathit{fft}}$ is the total number of FFTs. 'τ' may be set to a specific value capable of indicating an optimum performance, and may be decided by the searching process.

As can be seen from this embodiment, if the DFT matrix is used as the basic matrix of the codebook and at the same time it is combined with the frequency-axis-extended phase shift matrix or CDD, the combined result is phase-shifted to the frequency axis by the phase shift matrix, such that the present invention can construct or use a codebook including the precoding matrix to which the phase shift value suitable for a current channel is added. Therefore, the present invention can perform resource allocation on the frequency axis by the frequency-axis scheduling, such that it can sufficiently acquire a codebook gain.

In the case of constructing an exemplary codebook including the precoding matrixes of several ranks by the augmented matrix using the DFT matrix and/or the phase shift matrix, the above-mentioned exemplary codebook can be represented by the following equation 7:

$C_{15} = \{b_0, b_1, b_2, b_3, b_0b_1, b_0b_2, b_0b_3, b_1b_2, b_1b_3, b_2b_3, b_0b_1b_2, b_0b_1b_3, b_0b_2b_3, b_1b_2b_3, b_0b_1b_2b_3\}$

In Equation 7, $b_0$, $b_1$, $b_2$, or $b_3$ is a precoding matrix or a column vector of the precoding matrix. As can be seen from the codebook shown in the equation 7, a single codebook includes the precoding matrixes ($b_0$, $b_1$, $b_2$, and $b_3$) of the rank 1, the precoding matrixes ($b_0b_1$, $b_0b_2$, $b_0b_3$, $b_1b_2$, $b_1b_3$, and $b_2b_3$) of the rank 2, the precoding matrixes ($b_0b_1b_2$, $b_0b_1b_3$, $b_0b_2b_3$, and $b_1b_2b_3$) of the rank 3, and the precoding matrix ($b_0b_1b_2b_3$) of the rank 4.

In the case of constructing the codebook of the Equation 7, the number of precoding matrixes of each rank can be freely changed in consideration of a channel situation or a moving speed of a communication object. In other words, the number of precoding matrixes contained in the single codebook is limited to 15, the number of the precoding matrixes of the rank 1 is 4, the number of the precoding matrixes of the rank 2 is 6, the number of the precoding matrixes of the rank 3 is 4, the number of the precoding matrixes of the rank 4 is 1. In this case, the number of the precoding matrixes capable of being contained in the single codebook, and the number of the precoding matrixes of each rank can be modified in various ways.

The number of the precoding matrix indexes contained in the codebook may be set to 15, and may be denoted by 4 bits. For example, the precoding matrix indexes of 0000, 0001, 0010, 0011, 0100, 0101, 0110, 0111, 1000, 1001, 1010, 1011, 1100, 1101, and 1110 may be sequentially arranged from the left of the codebook of the Equation 7.

As can be seen from Equation 7, in the case of using the codebook including the precoding matrixes associated with several ranks, although the present invention does not transmit additional rank information simultaneously while requesting rank adaptation, it can recognize the above rank information on the basis of the precoding matrix index.

For example, the reception end selects the precoding matrix ($b_0b_3$) as an optimum precoding matrix from several precoding matrixes contained in the codebook shown in the Equation 7, and transmits (i.e., feeds back) the precoding matrix index of 0110 corresponding to the selected precoding ($b_0b_3$). Therefore, the transmission end must perform the precoding process using the precoding matrix ($b_0b_3$) using the precoding matrix index of 0110, such that it can be recognized that rank information (i.e., a rank) for rank adaptation along with the precoding matrix is 2.

The codebook structure (i.e., $C_{15}$) proposed by Equation 7 may be configured in the form of a codebook which does not require rank information for rank adaptation of (4,6,4,1) composed of a lower set of the basic DFT matrix.

The antenna selection (AS) matrix used as the basic matrix contained in several precoding matrixes according to this embodiment of the present invention will hereinafter be described in detail. Particularly, it should be noted that the DFT matrix has strong resistance to a high-correlation spatial channel.

The following equation 8 shows an exemplary antenna selection (AS) matrix capable of being applied to four Tx antennas:

$$\{a_0, a_1, a_2, a_3\} = \frac{1}{\sqrt{2}} \left\{ \begin{pmatrix} 1 \\ 1 \\ 0 \\ 0 \end{pmatrix} \begin{pmatrix} 1 \\ -1 \\ 0 \\ 0 \end{pmatrix} \begin{pmatrix} 0 \\ 0 \\ 1 \\ 1 \end{pmatrix} \begin{pmatrix} 0 \\ 0 \\ 1 \\ -1 \end{pmatrix} \right\}$$ [Equation 8]

As can be seen from the above Equation 8, it can be recognized that individual column vectors are orthogonal to each other. A first component of each column corresponds to a first Tx antenna, and a second component of each column corresponds to a second Tx antenna. A third component of each column corresponds to a third Tx antenna, and a fourth component of each column corresponds to a fourth Tx antenna. Provided that the present invention uses a single basic unitary matrix shown in the Equation 8, the reception end (e.g., the user equipment (UE)) feeds back feedback information of 2 bits to the transmission end (e.g., the base station (BS)), such that the transmission end may communicate with the reception end according to the SDM, SDMA, or the beam-forming scheme.

As described above, the present invention combines one or more column vectors contained in each column shown in Equation 8, such that the combined result may be used as a precoding matrix. The number of column vectors capable of being used as the precoding matrix may be decided by the rank (or the number of Tx streams). For example, if the number of Tx antennas is 4 and the rank is 2, two arbitrary column vectors from among four column vectors shown in Equation 8 indicating the 4×2 matrix are decided, such that the decided column vectors may be used as the precoding matrixes.

Also, the above-mentioned DFT basic matrix can be extended by a phase diagonal matrix shown in the following equation 9:

$$P(\Phi_i) = \begin{pmatrix} 1 & 0 & 0 & 0 \\ 0 & e^{j\Phi_i} & 0 & 0 \\ 0 & 0 & 1 & 0 \\ 0 & 0 & 0 & e^{j\Phi_i} \end{pmatrix} \quad \text{[Equation 9]}$$

In Equation 9, $\Phi_i$ is an i-th phase shift angle when an augmented matrix having one or more phase shift angles are used. $\Phi_i$ may be set to a predetermined value capable of maximizing the intensity of a Rx signal. The phase shift angle $\Phi_i$ may have a specific value, for example, $$\frac{2\pi m}{M}.$$

In this case, 'M' is the total number of Tx antennas. 'm' is an m-th virtual beam-forming pattern (i.e., a precoding matrix), and may have a predetermined integer value from among 0, 1, 2, ..., M−1. In other words, $\Phi_i$ may be equal to or higher than '0', and may be less than $2\pi$. In this way, the phase diagonal matrix shown in Equation 9 may be called a phase shift matrix as necessary. In more detail, the phase diagonal matrix shown in Equation 9 is multiplied by the basic matrix (e.g., DFT matrix or antenna selection (AS) matrix), such that a virtual beam pattern corresponding to each column vector contained in the basic matrix can be phase-shifted by the phase shift angle $\Phi_i$.

If the phase shift matrix of the antenna selection (AS) matrix codebook proposed by the present invention is extended to the frequency axis, the equation 9 is acquired. If the phase shift matrix extended to the frequency axis of the following equation 10 is applied to the precoding matrix, the present invention can acquire the same effect as that of a Cyclic Delay Diversity (CDD) structure.

$$P(k) = \begin{pmatrix} 1 & 0 & 0 & 0 \\ 0 & e^{-j2\pi \frac{\tau}{N_{\mathit{fft}}}k} & 0 & 0 \\ 0 & 0 & 1 & 0 \\ 0 & 0 & 0 & e^{-j2\pi \frac{\tau}{N_{\mathit{fft}}}k} \end{pmatrix} \quad \text{[Equation 10]}$$

In Equation 10, k is the order of OFDM Tx sub-carriers, and $N_{\mathit{fft}}$ is the total number of FFTs. '$\tau$' may be set to a specific value capable of indicating an optimum performance, and may be decided by the searching process.

As can be seen from this embodiment, if the antenna selection (AS) matrix is used as the basic matrix of the codebook and at the same time it is combined with the phase shift matrix (i.e., CDD), the combined result is phase-shifted to the frequency axis by the phase shift matrix, such that the present invention can construct or use a codebook including the precoding matrix to which the phase shift value suitable for a current channel is added. Therefore, in the same manner as in the DFT matrix, the present invention can perform resource allocation on the frequency axis by the frequency-axis scheduling, such that it can sufficiently acquire a codebook gain.

In the case of constructing an exemplary codebook including the precoding matrixes of several ranks by the augmented matrix using the antenna selection (AS) matrix and/or the phase shift matrix, the above-mentioned exemplary codebook can be represented by the following Equation 11:

$$C_{15} = \{a_0, a_1, a_2, a_3, a_0a_1, a_0a_2, a_0a_3, a_1a_2, a_1a_3, a_2a_3, a_0a_1a_2, a_0a_1a_3, a_0a_2a_3, a_1a_2a_3, a_0a_1a_2a_3\}$$

In Equation 11, $a_0$, $a_1$, $a_2$, or $a_3$ is a precoding matrix or a column vector of the precoding matrix. As can be seen from the codebook shown in the equation 11, a single codebook includes the precoding matrixes ($a_0$, $a_1$, $a_2$, and $a_3$) of the rank 1, the precoding matrixes ($a_0a_1$, $a_0a_2$, $a_0a_3$, $a_1a_2$, $a_1a_3$, and $a_2a_3$) of the rank 2, the precoding matrixes ($a_0a_1a_2$, $a_0a_1a_3$, $a_0a_2a_3$, and $a_1a_2a_3$) of the rank 3, and the precoding matrix ($a_0a_1a_2a_3$) of the rank 4.

In the case of constructing the codebook of the Equation 11, the number of precoding matrixes of each rank can be freely changed in consideration of a channel situation or a moving speed of a communication object. In other words, the number of precoding matrixes contained in the single codebook is limited to 15, the number of the precoding matrixes of the rank 1 is 4, the number of the precoding matrixes of the rank 2 is 6, the number of the precoding matrixes of the rank 3 is 4, the number of the precoding matrixes of the rank 4 is 1. In this case, the number of the precoding matrixes capable of being contained in the single codebook, and the number of the precoding matrixes of each rank can be modified in various ways.

The number of the precoding matrix indexes contained in the codebook may be set to 15, and may be denoted by 4 bits. For example, the precoding matrix indexes of 0000, 0001, 0010, 0011, 0100, 0101, 0110, 0111, 1000, 1001, 1010, 1011, 1100, 1101, and 1110 may be sequentially arranged from the left of the codebook of the Equation 10.

As can be seen from Equation 11, in the case of using the codebook including the precoding matrixes associated with several ranks, although the present invention does not transmit additional rank information simultaneously while requesting rank adaptation, it can recognize the above rank information on the basis of the precoding matrix index.

For example, the reception end selects the precoding matrix ($a_0a_3$) as an optimum precoding matrix from several precoding matrixes contained in the codebook shown in the Equation 11, and transmits (i.e., feeds back) the precoding matrix index of 0110 corresponding to the selected precoding ($a_0a_3$). Therefore, the transmission end must perform the precoding process using the precoding matrix ($a_0a_3$) using the precoding matrix index of 0110, such that it can be recognized that rank information (i.e., a rank) for rank adaptation along with the precoding matrix is 2.

FIG. 3 is a flow chart illustrating a feedback method according to one embodiment of the present invention.

A feedback method based on the codebook proposed by the present invention will hereinafter be described with reference to FIG. 3.

Referring to FIG. 3, at step S300, a reception end (e.g., a user equipment (UE)) receives a signal from a transmission end (e.g., a base station (BS)).

At step S310, the reception end selects the precoding matrix using the codebook including the precoding matrix associated with at least one rank according to the present invention. In this case, it is preferable that the reception end may select the precoding matrix capable of maximizing the intensity of the Rx signal at the above step S300.

The reception end feeds back precoding information of the selected precoding matrix at step S320.

In this way, in the case of using the codebook including the precoding matrixes of several ranks, there is no need to use additional information capable of feeding back rank information for rank adaptation, because the present invention can recognize the rank adaptation via the precoding matrix index (PMI) of the codebook itself as described above.

By the above-mentioned embodiments, the codebook is constructed by the basic DFT or antenna selection matrix such as $C_{15}$ of Equations 3, 7, and 11, but it should be noted that rank information for rank adaptation be contained in the precoding matrix index (PMI) of the constructed codebook.

The codebook, which is constructed by either the basic DFT matrix of Equation 4 or the basic antenna selection (AS) matrix of Equation 8, is combined with the phase shift matrix extended to the frequency axis, such that the phase shift of the basic DFT or the antenna selection (AS) matrix can be performed on the frequency axis. As a result, the codebook is phase-shifted to the frequency axis, such that the codebook gain can be maximized by the scheduling process.

In this case, if at least one of the codebook based on the basic DFT matrix and the codebook based on the basic antenna selection (AS) matrix is combined with the phase shift matrix extended to the frequency axis, the present invention may determine which one of codebooks will be used according to a channel environment or an antenna configuration.

By the above-mentioned method, a Rx signal R received via the antenna can be represented by the following equation 12:

$$R=HPCS+n \quad \text{[Equation 12]}$$

In Equation 12, H is a channel response, P is a phase shift matrix, C is a precoding matrix, S is a Tx data stream, and n is a noise component. The reception end is able to demodulate an original signal in consideration of the Rx signal R shown in Equation 12.

The conventional codebook structure must additionally add 2 bits as rank information for rank adaptability to an index bit of a precoding matrix, such that the total number of bits increases by 2 bits. However, an inventive codebook need not transmit 2 additional bits as rank information for rank adaptability, but includes the rank information for rank adaptability in the precoding matrix index, such that an amount of additional signaling overhead for the rank adaptability can be reduced.

If a phase shift matrix is extended to a frequency axis using the same method as that of a CDD, a gain required for the codebook can be acquired by a scheduling process, and the present invention has a low complexity lower than that of the conventional codebook structure. In other words, if the present invention uses a codebook in which a DFT matrix or an antenna selection matrix is used as a basic matrix, and is then coupled to a CDD, a phase is shifted to a frequency axis of a phase shift matrix, such that the present invention is able to use a codebook to which a phase shift value appropriate for a current channel is added. As a result, resources are allocated on the frequency axis by a frequency-axis scheduling, such that it is expected that a codebook gain can be sufficiently acquired.

If a DFT matrix or an antenna selection matrix is used as a basic matrix in the case of constructing a codebook proposed by the present invention, the present invention can design a codebook composed of only precoding matrix index information which does not require additional rank information for rank adaptation. Therefore, the present invention can reduce an amount of overhead of using additional signaling information in order to feed back the additional rank information for rank adaptation. If the present invention uses a basic DFT matrix or an antenna selection matrix in the case of designing a codebook, it has a low complexity lower than that of the conventional codebook structure.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Although the above-mentioned embodiments have disclosed the frequency hopping scheme available for uplink data packet transmission, it is obvious to those skilled in the art that the present invention can also be applied to downlink data packet transmission using the same or similar method as in the above-mentioned Tx method.

The invention claimed is:

1. A method for performing feedback at a reception end in a multi-antenna system, the method comprising:
   selecting a precoding matrix index from a codebook including at least one precoding matrix, wherein the precoding matrix index indicates the at least one precoding matrix and rank information simultaneously;
   transmitting feedback information including the selected precoding matrix index to a transmission end, wherein the feedback information does not include a rank indicator indicating the rank information; and
   receiving a signal precoded by the at least one precoding matrix indicated by the selected precoding matrix index from the transmission end,
   wherein each of the at least one precoding matrix included in the codebook corresponds to each of rank 1, rank 2, rank 3, or rank 4.

2. The method according to claim 1, wherein the codebook comprises a Discrete Fourier Transform (DFT) codebook or an Antenna Selection (AS) codebook.

3. The method according to claim 2, wherein the received signal (R) is represented by Equation 1:

$$R=HPCS+n \quad \text{<Equation 1>}$$

where R is the received signal, H is a channel response, P is a phase shift matrix extended to a frequency axis, C is the precoding matrix indicated by the selected precoding matrix index, S is a data stream and n is a noise component.

4. The method according to claim 3, wherein the DFT codebook ($C_{15}$) is represented by Equation 2:

$$C_{15}=\{b_0b_1,b_2,b_3,b_0b_1,b_0b_2,b_0b_3,b_1b_2,b_1b_3,b_2b_3, \\ b_0b_1b_2,b_0b_1b_3,b_0b_2b_3,b_1b_2b_3,b_0b_1b_2b_3\} \quad \text{<Equation 2>}$$

where $$\{b_0, b_1, b_2, b_3\} = \frac{1}{2}\left\{\begin{pmatrix}1\\1\\1\\1\end{pmatrix}, \begin{pmatrix}1\\j\\-1\\-j\end{pmatrix}, \begin{pmatrix}1\\-1\\1\\-1\end{pmatrix}, \begin{pmatrix}1\\-j\\-1\\j\end{pmatrix}\right\},$$

and wherein the AS codebook ($C_{15}$) is represented by Equation 3:

$$C_{15}=\{a_0,a_1,a_2,a_3,a_0a_1,a_0a_2,a_0a_3,a_1a_2,a_1a_3,a_2a_3, \\ a_0a_1a_2,a_0a_1a_3,a_0a_2a_3,a_1a_2a_3,a_0a_1a_2a_3\} \quad \text{<Equation 3>}$$

where $$\{a_0, a_1, a_2, a_3\} = \frac{1}{\sqrt{2}}\left\{\begin{pmatrix}1\\1\\0\\0\end{pmatrix}\begin{pmatrix}1\\-1\\0\\0\end{pmatrix}\begin{pmatrix}0\\0\\1\\1\end{pmatrix}\begin{pmatrix}0\\0\\1\\-1\end{pmatrix}\right\}.$$

5. The method according to claim 3, wherein if the codebook is the DFT codebook, the phase shift matrix extended to the frequency axis is represented by Equation 4:

$$P(\tau) = \begin{pmatrix} 1 & 0 & 0 & 0 \\ 0 & e^{-j2\pi \frac{\tau}{N_{fft}} k} & 0 & 0 \\ 0 & 0 & e^{-j2\pi \frac{2\tau}{N_{fft}} k} & 0 \\ 0 & 0 & 0 & e^{-j2\pi \frac{3\tau}{N_{fft}} k} \end{pmatrix} \quad \text{<Equation 4>}$$

where k is an order of transmission (Tx) subcarriers, $N_{fft}$ is a total number of Fast Fourier Transform (FFT), and r is a specific value capable of indicating an optimum performance.

6. The method according to claim 3, wherein if the codebook is the AS codebook, the phase shift matrix extended to the frequency axis is represented by Equation 5:

$$P(\tau) = \begin{pmatrix} 1 & 0 & 0 & 0 \\ 0 & e^{-j2\pi \frac{\tau}{N_{fft}} k} & 0 & 0 \\ 0 & 0 & 1 & 0 \\ 0 & 0 & 0 & e^{-j2\pi \frac{\tau}{N_{fft}} k} \end{pmatrix} \quad \text{<Equation 5>}$$

where k is an order of transmission Tx subcarriers, $N_{fft}$ is a total number of Fast Fourier Transform (FFT), and r is a specific value capable of indicating an optimum performance.

* * * * *

UNITED STATES PATENT AND TRADEMARK OFFICE
CERTIFICATE OF CORRECTION

PATENT NO. : 8,199,853 B2
APPLICATION NO. : 12/673749
DATED : June 12, 2012
INVENTOR(S) : Jae Wan Kim, Bin Chul Ihm and Jin Hyuk Jung It is certified that error appears in the above-identified patent and that said Letters Patent is hereby corrected as shown below:

Title Page: Item (86) § 371 (c)(1), (2), (4) Date: delete "Jan. 14, 2011" and insert -- Jan. 4, 2011 --.

Signed and Sealed this
Eighteenth Day of December, 2012

David J. Kappos
*Director of the United States Patent and Trademark Office*